US006856249B2

(12) United States Patent
Strubbe et al.

(10) Patent No.: US 6,856,249 B2
(45) Date of Patent: Feb. 15, 2005

(54) SYSTEM AND METHOD OF KEEPING TRACK OF NORMAL BEHAVIOR OF THE INHABITANTS OF A HOUSE

(75) Inventors: Hugo Strubbe, Yorktown Heights, NY (US); Elmo M. A. Diederiks, Veldhoven (NL); Bartel Marinus van de Sluis, Eindhoven (NL); Mark Henricus Verberkt, Eindhoven (NL); Mi-Suen Lee, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 306 days.

(21) Appl. No.: 10/093,301

(22) Filed: Mar. 7, 2002

(65) Prior Publication Data

US 2003/0169171 A1 Sep. 11, 2003

(51) Int. Cl.[7] ........................ G08B 21/00; G08B 23/00; G08B 13/18; H04M 11/04

(52) U.S. Cl. ................................ 340/573.1; 340/573.3; 340/573.4; 340/540; 340/556; 379/37; 379/38; 379/39; 379/40; 379/51

(58) Field of Search ........................... 340/573.1, 573.3, 340/573.4, 540, 556; 379/37–51

(56) References Cited

U.S. PATENT DOCUMENTS

| | | | | | |
|---|---|---|---|---|---|
| 5,202,666 | A | * | 4/1993 | Knippscheer | 340/573.1 |
| 5,912,624 | A | * | 6/1999 | Howard, II | 340/632 |
| 5,954,512 | A | * | 9/1999 | Fruge | 434/238 |
| 6,107,918 | A | * | 8/2000 | Klein et al. | 340/511 |
| 6,313,743 | B1 | | 11/2001 | Abraham-Fuchs et al. | 340/505 |
| 6,348,867 | B1 | | 2/2002 | Myllymaki | 340/573.1 |
| 6,525,663 | B2 | * | 2/2003 | Colmenarez et al. | 340/573.1 |

FOREIGN PATENT DOCUMENTS

| | | | | | |
|---|---|---|---|---|---|
| EP | 1071055 | A1 | | 1/2001 | G08B/21/00 |
| WO | WO 01/63576 | A2 | * | 8/2001 | G08B/13/194 |

* cited by examiner

*Primary Examiner*—Jeffery Hofsass
*Assistant Examiner*—Lam Pham

(57) ABSTRACT

A home control system for automatic detection and warning of abnormal behavior includes a unit for observing behavior in a predetermined area under surveillance, a unit for processing an output of observed behavior from the unit for observing, and a pattern recognition module for recognizing whether the observed behavior is associated with predefined normal behaviors. The detection of predetermined normal behavior in progress leads to a provision of an anticipatory action. Upon recognition that the observed behavior is abnormal, an alarm signal is triggered to remind the user.

14 Claims, 2 Drawing Sheets

SYSTEM AND METHOD OF KEEPING TRACK OF NORMAL BEHAVIOR OF THE INHABITANTS OF A HOUSE

BACKGROUND OF THE INVENTION

1. Field of the Invention

The present invention relates to home control systems. More particularly, the present invention relates to home control systems capable of tracking the series of actions preformed by a particular behavior of the inhabitants of a house in order to take an anticipatory action or trigger an alarm signal when abnormal behavior occurs.

2. Description of the Invention

In general, home automation systems are based on limited event detection, either purely reactive (i.e., switching on the light when motion is detected), or preprogrammed (i.e., heating comes on at 7 a.m. on a regular basis). These systems do not learn by example what are the sequences of actions that the user "normally" performs regularly, such as coming home at a certain time, switching on the light in the stairs, going upstairs to change clothes, or opening the refrigerator for a drink. As a result, the conventional home control systems cannot take any anticipatory action to assist the user in carrying out daily activities, nor can they warn the user or any other person when some of their routine actions are not performed. Accordingly, there is a need in the art for a home control system that is capable of providing an automatic detection of abnormal behaviors or events to anticipate a next action and trigger an alarm signal.

SUMMARY OF THE INVENTION

The present invention relates to a method and system for tracking the series of actions performed by a person to determine the behavior of the person in the house, such that an anticipatory action can be performed to assist the person in carrying out daily activities. The system also provides as an alarm signal to the person in the event that the person deviates from the normal behavior.

According to one aspect of the invention, the method for automatically detecting the abnormal behavior of a person includes the steps of: tracking the series of actions performed to determine the behavior of the person in a predetermined area under surveillance; comparing the tracked behavior with at least one of a plurality of predetermined normal behaviors to establish a behavior match; if a match is established, determining whether at least one action from the matched predetermined normal behavior is omitted by the person; and, transmitting an alarm signal when at least one action from the matched predetermined normal behavior is omitted, wherein the alarm signal comprises one of a conversational content, an informative content, and a reminder content. The method further includes the steps of notifying a pre-designated person when at least one action from the matched predetermined normal behavior is omitted, and anticipating and performing at least one action from the matched predetermined normal behavior to be performed by the person when a match is established, wherein the anticipated action includes activating at least one electronic device provided in the area under surveillance. In the embodiment, the behavior of the person is tracked with cameras and sound sensors.

According to another aspect of the invention, the method for automatic detection of an abnormal behavior includes the steps of: observing the series of actions performed by a person to determine the behavior of a person in a predetermined area under surveillance; identifying whether the observed behavior is associated with at least one of a plurality of predetermined normal behaviors by comparing the observed behavior with a plurality of predetermined behavioral patterns stored in a normal behavior module; and, transmitting an alarm signal to the person when at least one of the predetermined behavior patterns in the normal behavior module is not performed, wherein the step of transmitting the alarm signal comprises the step of notifying a pre-designated person when at least one action from the matched predetermined normal behavior is omitted. The method further includes the steps of anticipating and performing at least one action from the predetermined normal behaviors to be performed by the person when the observed behavior is associated with at least one of the plurality of the predetermined normal behaviors.

According to a further aspect of the invention, a system for automatic detection of an abnormal behavior includes: means for observing the series of actions performed by a person to determine the behavior of the person in a predetermined area under surveillance; means for analyzing output data from the observing means to determine whether the observed behavior is associated with at least one of a plurality of predetermined normal behaviors comprised of a plurality of actions; means for storing the predetermined normal behaviors; and, means for transmitting an alarm signal to the person when at least one of the plurality of predetermined normal behaviors is omitted. The system further includes means for anticipating at least one action from the predetermined normal behaviors to be performed by the person when the observed behavior is associated with at least one of the plurality of the predetermined normal behaviors; means for activating at least one electronic device provided in the area under surveillance; and, means for notifying a pre-designated person when at least one of the plurality of predetermined normal behaviors is omitted.

BRIEF DESCRIPTION OF THE DRAWINGS

A more complete understanding of the method and apparatus of the present invention is available by reference to the following detailed description when taken in conjunction with the accompanying drawings wherein.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of simplicity and clarity, detailed descriptions of well-known devices, circuits, and methods are omitted so as not to obscure the description of the present invention with unnecessary detail.

Figure 1:
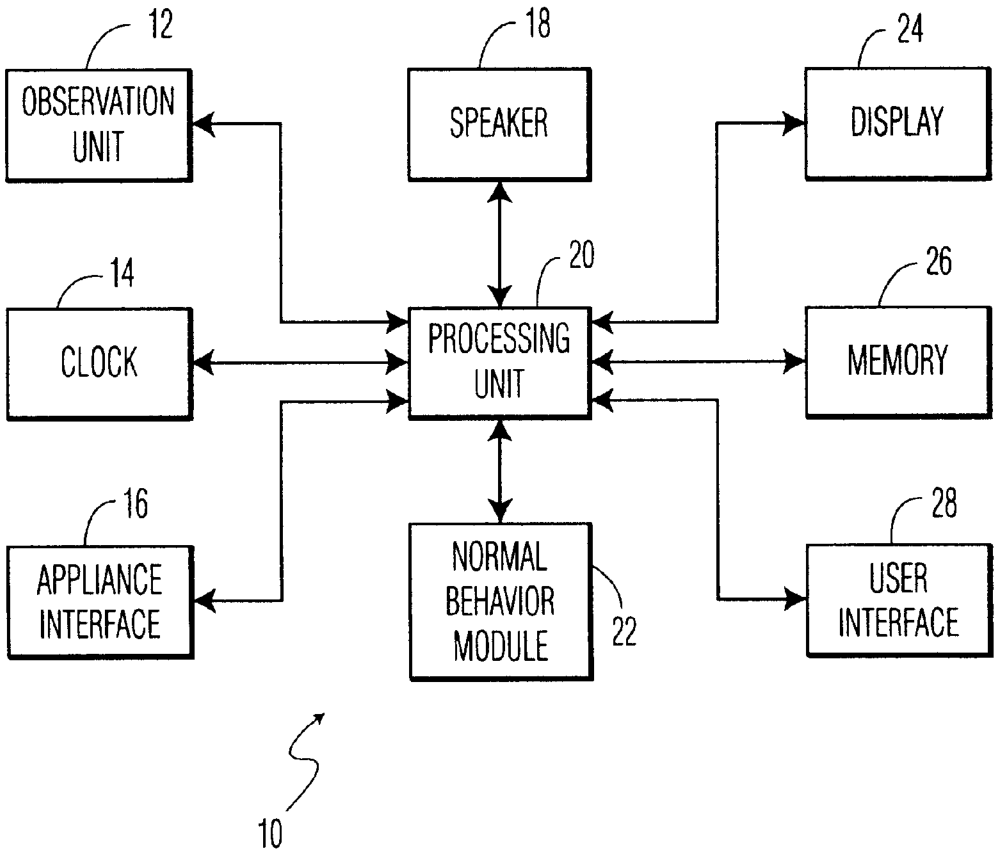
FIG. 1 illustrates an overview embodiment of a system according to the present invention.

FIG. 1 is an overview of the embodiment of a home control system 10 according to the present invention. The inventive system 10 may be embodied as any computing device, such as a personal computer or workstation that contains a processor, such as a central processing unit (CPU), a memory, such as RAM and ROM. As shown in FIG. 1, major components of the inventive system 10 include an observation unit 12, a clock 14, an appliance interface 16, a speaker unit 18, a processing unit 20, a normal behavior module 22, a display 24, a memory 26, and a user interface 28. The transmission between the components shown in FIG. 1 can be made by any of the fiber optic, RF, copper wires, LAN, WAN, twisted pair, etc., or any type of communication system according to need.

The observation unit 22 may include a plurality of video cameras located throughout the house to keep a predetermined area under surveillance over time. The function of the observation unit 22 is to identify normal behavior patterns of the inhabitants of the house. In this invention, a normal behavior includes a list of action. The clock 14 is provided to keep track of the time while observing their behaviors at different locations of the house. As such, the system 10 logs all types of action sequences occurring at a particular time and place and the identity of the person who performs these acts. The observation unit 22 can be a video camera, an optical sensor, an infrared sensor which senses body heat as just a few of the many possible embodiments that the observation unit can comprise. The observation unit 22 may also have the ability to sense sounds. The appliance interface 14 is coupled to a number of electronic devices located throughout the house, such as the television, refrigerator, lamps, stereo system, etc. Hence, the system 10 is capable of detecting the time and location when a particular person activates one of these devices as he or she is being watched by the observation unit 12.

In operation, the inventive system 10 learns and registers the "normal behavior" of a particular person over time in the normal behavior module 22. The behavioral patterns stored in the normal behavior module 22 can include sounds consistent with patterns of action. For example, when a kid opens the front door and yells, "Hi Mom, I am home" between 3:30 p.m. and 4:00 p.m. on a regular basis, this sound will be transmitted to the processing unit 20 and stored as a "normal behavior." A "normal behavior" may be a recurring behavior pattern that is time based and includes a series of actions that the user typically performs on a regular basis. For example, a particular person may come home by 7 p.m. during weekdays, and perform the following sequence of acts: switching on a light, switching on the TV, opening the refrigerator, etc. A "normal behavior" may also include the identity of electronically tagged devices (i.e., if the garbage bin has been given a tag, the system 10 notices when it passes through the front door of the house). Furthermore, a "normal behavior" may include the identity of a number of electronic devices located throughout the house when they are activated as a part of a particular person's routine.

After storing the "normal behaviors" of the different inhabitants of the house in a normal behavior module 22, the present invention 10 compares the current behavior of a particular person detected by the observation unit 12 against the "predetermined normal behaviors" stored in the normal behavior module 22 to find a behavior match. To this end, the observation unit 12 communicates with a processing unit 20, which analyzes data from the observation unit 12 to determine whether any behavior patterns observed by the observation unit 12 are associated with "predetermined normal behaviors" stored in the normal behavior module 22. For example, as soon as the observation unit 12 notices a particular person begin one of his or her normal behavior patterns (i.e., the person coming home around 6 p.m.), the system 10 compares this pattern of normal behavior with the "predetermined normal behaviors." Then, the system 10 recognizes a sequence of actions following this particular "normal behavior" from the "predetermined normal behaviors" and thus can take anticipatory actions to assist the user (i.e., switching on the light in the stairs, and later switching on appropriate lighting for reading the newspaper). Alternatively, the system 10 is configured to notify the person when an abnormal behavior is detected, or when one of the recognized patterns of action is not performed (i.e., if the normal behavior of leaving in the morning on Thursdays includes putting out the garbage bin, the system 10 sends an alarm signal, which can be a conversational content (i.e., "why don't you throw the garage?") or a reminder content (i.e., "don't forget to throw the garbage". Furthermore, the system 10 is configured to send an informative signal to any other designated person if abnormal behavior occurs (i.e., notifying a relative in a remote location if a specific person fails to come home by a certain time).

Therefore, a match between the observed behavior and the "predetermined normal behavior" leads to an anticipatory action, i.e. the system 10 activates the next home devices that are typically activated by the person according to the "predetermined normal behavior" (i.e., the person came home at a certain time, went upstairs, opened the refrigerator, and switched on the reading light). Thus, the system 10 anticipates turning on the light and does it automatically before the person does. When there is only a partial match, the system 10 transmits an alarm signal to inform the person, via the speaker 18, of the discrepancy.

There can be severity levels associated with the detected normal behavior, which may be assigned to the detected behavior, and may be in conjunction with a particular area under surveillance. For example, falling down and not getting up for a half hour is set to high and not putting the garbage out is set to low. In the former instance, the system 10 may be also set to contact a designated person selected by the user or the emergency operator. Thus, the behavior recognition can be heuristic, and could be also updated with new models according to need. The severity ratings may be set manually by the system installer to "common sense" values, but the user may modify them. Alternatively, the severity rating can be modified by the system 10 itself based on the user's feedback. If the user has to take a certain medicine from the refrigerator daily, the system 10 may be set to always remind the user who comes home, but skips the step of going into the kitchen, to announce: "Aren't you forgetting to take something out of the fridge?" To set different severity ratings, a suitable interface exists between the user and the inventive system 10 to gather the user's rating for the type of events or actions he or she wishes to be reminded of. To this end, the display 24 and the user interface (i.e., keyboard and mouse) may be used to interact with the system 10.

The technique in tracking a person in a room based on a series of frame data generated by a typical video camera. Tracking the movement of a person in a particular area is well know in the art that can be performed in a variety of ways. See for example, U.S. Pat. No. 5,969,755, filed by "Courtney", the contents of which are hereby incorporated by reference. "Courtney" discloses a system that is capable of providing automatic content-based video indexing from object motion in which moving objects is detected using motion segmentations methods. Objects are tracked through segmented data in an object tracker, such that a symbolic representation of the video can be generated in the form of an annotated graphics describing the objects and their movement. The graph is then indexed using a rule based classification scheme to identify events of interest such as appearance/disappearance, entrance/exit, motion of objects, etc.

Figure 2:
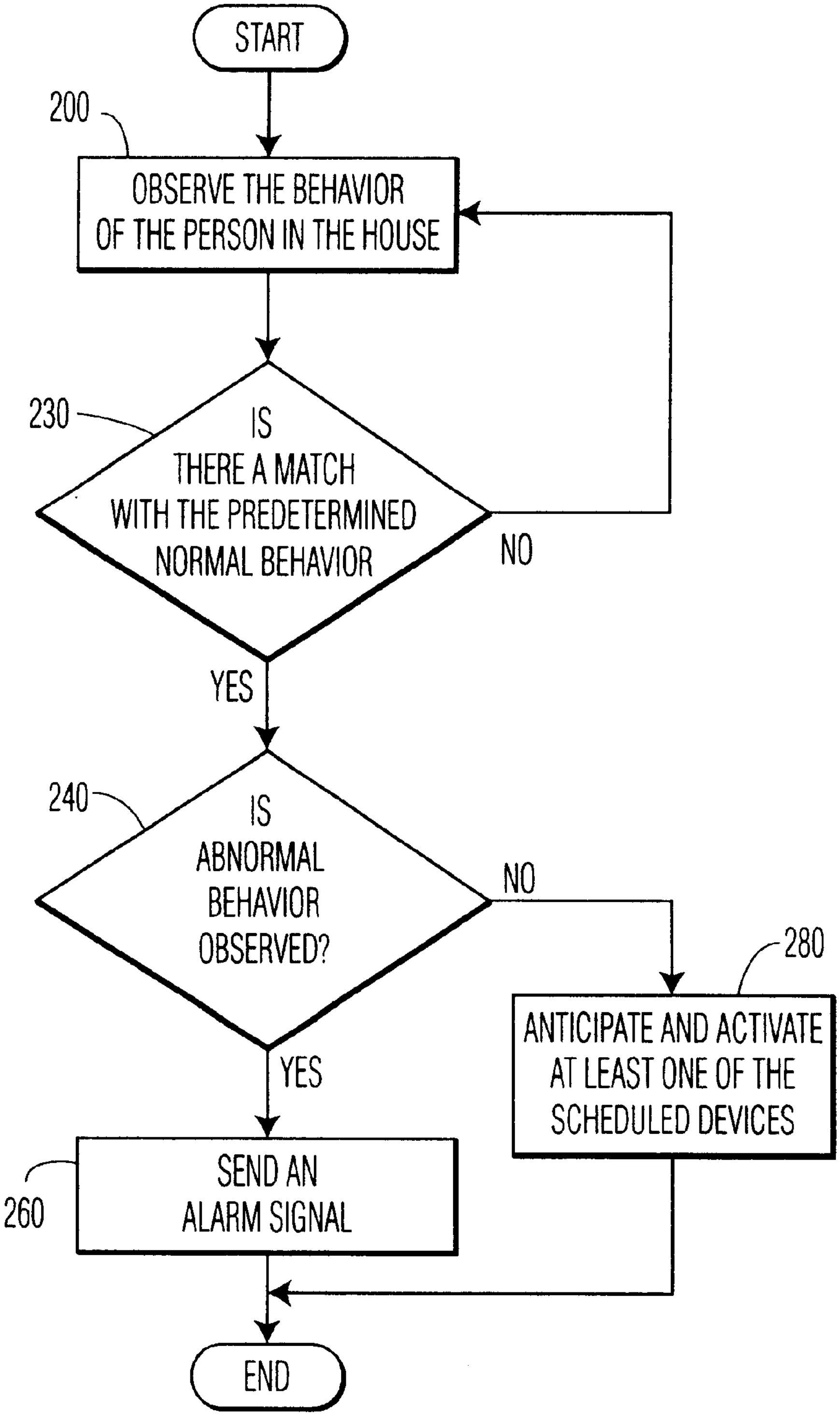
FIG. 2 is a flowchart providing an overview of a method according to the present invention.

FIG. 2 is a flow diagram illustrating the operation steps performed by the present invention to detect the series of actions performed by a person to determine the behavior of the person so that a series of anticipation actions or trigger an alarm signal can be made to the person. In step 200, the movement or the image of the person could be scanned and compared to identify whether at least one person is located in the house. Then, the behavior of the person is observed. In step 220, there is an identification as to whether the behavior patterns observed in step 200 is associated with at least one of a plurality of "predetermined normal behaviors" by comparing the behavior observed with a plurality of behavioral patterns stored in the normal behavior module 22. The plurality of the behaviors in the normal behavior 22 could be images as well as sound. If a match is found within a predetermined range of accuracy, the processing unit 20 continues to receive signals from the observation unit 22 to determine whether the abnormal behavior is observed or whether one of the sequences of actions associated with the predetermined normal behavior is omitted in step 240. If so, the processing unit 20 generates a control signal to transmit an alarm signal to the user via the speaker 18 in step 260. For example, if the predetermined normal behavior recognizes that John to take out the garbage container every Friday morning before going to work, as the person leaves for work without taking the garbage container, the system 10 notifies John in a number of different formats (i.e., "Why don't you take out the garbage?", "Don't forget to take out the garbage" or "Nicole (a wife), John forgot to take the garbage out"). At the same time, if no abnormal behavior is observed in step 240, the normal behavior in progress leads to anticipatory actions (i.e., turning at least one of the electronic devices in the house). Then, the processor unit 20 generates a control signal to activate the anticipated activation of the lamp in step 280 before the person does, thereby allowing the person to perform his or her routine tasks with ease. For example, if the person always turns the television on right after he or she comes home late on a regular basis, the system 10 upon detecting the person entering the house, will turn the TV on automatically for the person as it is one of the recognized normal behaviors.

It should be noted that FIG. 2 is a flow diagram illustrating the process performed by the present invention, wherein the rectangular elements indicate computer software instructions, whereas the diamond-shaped element represents computer software instructions that affect the execution of the computer software instructions represented by the rectangular blocks. The flow diagrams illustrate the functional information that one of ordinary skill in the art needs to fabricate circuits or to generate computer software to perform the processing required of the particular apparatus.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention includes all embodiments falling within the scope of the appended claims.

We claim:

1. A method for automatically detecting the abnormal behavior of a person, the method comprising the steps of:

tracking a series of actions performed by said person to determine the behavior of said person in a predetermined area under surveillance;

comparing said determine behavior with at least one of a plurality of predetermined normal behaviors to establish a behavior match;

if a match is established, determining whether at least one action from said matched predetermined normal behavior is omitted by said person; and, transmitting an alarm signal when at least one action from said matched predetermined normal behavior is omitted.

2. The method of claim 1, wherein said alarm signal comprises one of a conversational content, an informative content, and a reminder content.

3. The method of claim 1, farther comprising the step of transmitting said alarm signal comprises the step of notifying a pre-designated person when at least one action from said matched predetermined normal behavior is omitted.

4. The method of claim 1, further comprising the step of storing the plurality of said predetermined normal behaviors in a memory medium.

5. The method of claim 1, wherein the step of tracking the series of actions performed by the person further comprises the step of obtaining at least a partial image of the face of said person.

6. The method of claim 1, further comprising the steps of:

if a match is established, anticipating at least one action from said matched predetermined normal behavior to be performed by said person; and, performing said anticipated action automatically.

7. The method of claim 6, wherein said anticipated action includes activating at least one electronic device provided in the area under surveillance.

8. The method of claim 1, wherein the behavior of said person is tracked with cameras.

9. The method of claim 1, wherein the behavior of said person is tracked with sound sensors.

10. The method of claim 1, wherein at least one of the predetermined normal behaviors includes recognizing when a plurality of individuals enters the area under surveillance.

11. A method for automatic detection of an abnormal behavior, the method comprising the steps of:

observing a series of actions performed by a person to determine the behavior of said person in a predetermined area under surveillance;

identifying whether said determine behavior is associated with at least one of a plurality of predetermined normal behaviors by comparing said determine behavior with a plurality of predetermined behavioral patterns stored in a normal behavior module; and, transmitting an alarm signal to said person when at least one of a predetermined behavior patterns in said normal behavior module is not performed, further comprising the steps of anticipating and performing at least one action from said predetermined normal behaviors to be performed by said person when said determined behavior is associated with at least one of the plurality of said predetermined normal behaviors.

12. The method of claim 11, wherein said anticipated action includes activating at least one electronic device provided in the area under surveillance.

13. A system for automatic detection of an abnormal behavior, comprising:

means for observing a series of actions performed by a person to determine the behavior of said person in a predetermined area under surveillance;

means for analyzing output data from said observing means to determine whether said observed behavior is associated with at least one of a plurality of predetermined normal behaviors comprised of a plurality of actions;

means for storing said predetermined normal behaviors; and, means for transmitting an alarm signal to said person when at least one of said plurality of predetermined normal behaviors is omitted, further comprising means for anticipating at least one action from said predetermined normal behaviors to be performed by said person when said observed behavior is associated with at least one of the plurality of said predetermined normal behaviors.

14. The system of claim 13, further includes means for activating at least one electronic device provided in the area under surveillance.

* * * * *